United States Patent
Otsuki et al.

(10) Patent No.: US 8,283,884 B2
(45) Date of Patent: Oct. 9, 2012

(54) NUMERICAL CONTROLLER CONTROLLING FIVE-AXIS MACHINING TOOL

(75) Inventors: Toshiaki Otsuki, Yamanashi (JP); Soichiro Ide, Yamanashi (JP); Osamu Hanaoka, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 21 days.

(21) Appl. No.: 13/035,635

(22) Filed: Feb. 25, 2011

(65) Prior Publication Data

US 2011/0234142 A1  Sep. 29, 2011

(30) Foreign Application Priority Data

Mar. 29, 2010 (JP) ................. 2010-075670

(51) Int. Cl.
  *G05B 19/25* (2006.01)
(52) U.S. Cl. ............. 318/572; 318/568.12; 318/571
(58) Field of Classification Search .............. 318/572, 318/568.12, 571, 560, 567; 700/187
See application file for complete search history.

(56) References Cited

U.S. PATENT DOCUMENTS

| 2009/0140684 A1 | 6/2009 | Otsuki et al. |
| 2011/0202167 A1* | 8/2011 | Iwashita et al. ............... 700/187 |

FOREIGN PATENT DOCUMENTS

| DE | 100 46 092 A1 | 4/2002 |
| DE | 101 55 430 A1 | 5/2003 |
| JP | 2009-151756 | 7/2009 |

* cited by examiner

*Primary Examiner* — Karen Masih
(74) *Attorney, Agent, or Firm* — Drinker Biddle & Reath LLP

(57) ABSTRACT

A five-axis machining tool that machines a workpiece mounted on a table using three linear axes and two rotary axes is controlled by a numerical controller. The numerical controller calculates a translational compensation amount and a rotational compensation amount by obtaining axis-dependent translational compensation amounts and axis-dependent rotational compensation amounts on the basis of commanded axis positions. Then, the numerical controller moves the three linear axes and the two rotary axes of the five-axis machining tool to positions obtained by adding the translational compensation amount and the rotational compensation amount thus calculated to a command linear axis position and a command rotary axis position, respectively.

12 Claims, 8 Drawing Sheets

NUMERICAL CONTROLLER CONTROLLING FIVE-AXIS MACHINING TOOL

RELATED APPLICATION DATA

This application claims priority under 35 U.S.C. §119 and/or §365 to Japanese Application No. 2010-075670 filed Mar. 29, 2010, the entire contents of which are incorporated herein by reference.

BACKGROUND OF THE INVENTION

1. Field of the Invention

The present invention relates to a numerical controller that controls a five-axis machining tool having three linear axes and two rotary axes. In particular, the present invention relates to a numerical controller that performs control so as to move a tool center point position to a position without any error while also compensating the tool orientation (direction) to an orientation (direction) without any error by setting compensation amounts corresponding to errors such as linear axis-dependent translational errors or linear axis-dependent rotational errors dependent on a linear axis position, or rotary axis-dependent translational errors or rotary axis-dependent rotational errors dependent on a rotary axis position, to thereby perform high precision machining.

2. Description of the Related Art

Japanese Patent Application Laid-Open No. 2009-151756 discloses a technique of dividing each of a linear axis coordinate system and a rotary axis coordinate system into lattice regions, storing a lattice point compensation vector for each lattice point, and calculating axis-dependent translational compensation amounts and axis-dependent rotational compensation amounts from a linear-axis position and a rotary-axis position based on the lattice point compensation vectors to compensate the linear-axis position.

In the aforementioned technique disclosed in Japanese Patent Application Laid-Open No. 2009-151756, only compensation for the linear-axis position is made. That is, while a tool center point position moves to a position without any error, the orientation (direction) of the tool is still erroneous.

Such compensation of the conventional technique will not cause any problem when machining is performed using a tool center point. However, when machining is performed using a side face of a tool or when machining is performed in the direction of a tool such as drilling, the orientation (direction) of a tool is important and only the compensation to move a tool center point position to a position without any error is not sufficient. Thus, high precision machining cannot be performed according to the conventional technique if there is an error caused by the mechanical system in machining with a side face of a tool or drilling with a five-axis machining tool.

Major errors caused in a five-axis machining tool that machines a workpiece by means of three linear axes and two rotary axes includes the following four errors: (1) a linear axis-dependent translational error dependent on a linear axis position and (2) a rotary axis-dependent translational error dependent on a rotary axis position, which are translational errors; and (3) a linear axis-dependent rotational error dependent on a linear axis position and (4) a rotary axis-dependent rotational error dependent on a rotary axis position, which are rotational errors.

SUMMARY OF THE INVENTION

Therefore, the present invention sets compensation amounts corresponding to the aforementioned four errors to obtain a translational compensation amount based on the compensation amounts and adds the obtained translational compensation amount to a command linear axis position, and to obtain a rotational compensation amount and adds the obtained rotational compensation amount to a command rotary axis position. In this manner, it is an object of the present invention to provide a numerical controller for controlling a five-axis machining tool that moves a tool center point position to a position without any error while also compensating the tool orientation (direction) to a direction without any error to realize high precision machining. In other words, it is an object of the present invention to provide a numerical controller that may perform machining in a tool orientation (direction) as commanded even in machining with a side face of a tool or drilling with a five-axis machining tool.

The present invention relates to a numerical controller for controlling a five-axis machining tool that machines a workpiece mounted on a table using three linear axes and two rotary axes. The numerical controller comprises: an axis-dependent compensation amount calculating unit that obtains an axis-dependent translational compensation amount and an axis-dependent rotational compensation amount on the basis of a commanded axis position; a translational compensation amount calculating unit that obtains a translational compensation amount from the axis-dependent translational compensation amount; a rotational compensation amount calculating unit that obtains a rotational compensation amount from the axis-dependent rotational compensation amount; a compensation amount adding unit that adds the translational compensation amount to a command linear axis position and adds the rotational compensation amount to a command rotary axis position; and a unit that drives the three linear axes and the two rotary axes to positions obtained by the compensation amount adding unit.

The axis-dependent compensation amount calculating unit may obtain a rotary axis-dependent translational compensation amount and a rotary axis-dependent rotational compensation amount as the axis-dependent translational compensation amount and the axis-dependent rotational compensation amount, respectively, on the basis of the command rotary axis position, the translational compensation amount calculating unit may obtain the translational compensation amount from the rotary axis-dependent translational compensation amount obtained by the axis-dependent compensation amount calculating unit, and the rotational compensation amount calculating unit may obtain the rotational compensation amount from the rotary-axis dependent rotational compensation amount obtained by the axis-dependent compensation amount calculating unit.

The axis-dependent compensation amount calculating unit may obtain a linear axis-dependent translational compensation amount and a linear axis-dependent rotational compensation amount as the axis-dependent translational compensation amount and the axis-dependent rotational compensation amount, respectively, on the basis of the command linear axis position, the translational compensation amount calculating unit may obtain the translational compensation amount from the linear axis-dependent translational compensation amount obtained by the axis-dependent compensation amount calculating unit, and the rotational compensation amount calculating unit may obtain the rotational compensation amount from the linear axis-dependent rotational compensation amount obtained by the axis-depending compensation amount calculating unit.

The axis-dependent compensation amount calculating unit may obtain a linear axis-dependent translational compensation amount and a linear axis-dependent rotational compensation amount on the basis of the command linear axis position and may further obtain a rotary axis-dependent translational compensation amount and a rotary axis-dependent rotational compensation amount on the basis of the command rotary axis position, as the axis-dependent translational compensation amount and the axis-dependent rotational compensation amount, the translational compensation amount calculating unit may obtain the translational compensation amount from the linear axis-dependent translational compensation amount and the rotary axis-dependent translational compensation amount obtained by the axis-dependent compensation amount calculating unit, and the rotational compensation amount calculating unit may obtain the rotational compensation amount from the linear axis-dependent rotational compensation amount and the rotary axis-dependent rotational compensation amount obtained by the axis-dependent compensation amount calculating unit.

The two rotary axes may be rotary axes for turning a tool head, and the rotational compensation amount calculating unit may obtain a compensation amount for rotating for compensation of a rotational error tool length compensation vector having a rotational error with respect to a tool length compensation vector as a rotational compensation amount.

The axis-dependent compensation amount calculating unit may divide a three-dimensional coordinate system space defined by the three linear axes into lattice regions at predetermined intervals in the respective axis directions, store lattice point compensation vectors having rotational compensation amounts and translational compensation amounts for respective lattice points in the lattice regions, and calculate linear axis-dependent rotational compensation amounts and linear axis-dependent translational compensation amounts for positions of the three linear axes on the basis of the lattice point compensation vectors.

The axis-dependent compensation amount calculating unit may divide a two-dimensional coordinate system space defined by the two rotary axes into lattice regions at predetermined intervals in the respective lattice directions, store lattice point compensation vectors having rotational compensation amounts and translational compensation amounts for respective lattice points in the lattice regions, and calculate rotary axis-dependent rotational compensation amounts and rotary axis-dependent translational compensation amounts for positions of the two rotary axes on the basis of the lattice point compensation vectors.

The axis-dependent compensation amount calculating unit may divide a one-dimensional coordinate system space of one rotary axis of the two rotary axes at predetermined intervals, store division point compensation vectors having rotational compensation amounts and translational compensation amounts for respective division points at the predetermined intervals, divide a one-dimensional coordinate system space of the other rotary axis at predetermined intervals, store division point compensation vectors having rotational compensation amounts and translational compensation amounts for respective division points at the predetermined intervals, and calculate rotary axis-dependent rotational compensation amounts and rotary axis-dependent translational compensation amounts for positions of the respective two rotary axes on the basis of the division point compensation vectors.

The axis-dependent compensation amount calculating unit may divide a two-dimensional coordinate system space defined by two linear axes of the three linear axes into lattice regions at predetermined intervals in the respective axis directions, store lattice point compensation vectors having rotational compensation amounts and translational compensation amounts for respective lattice points in the lattice regions, and calculate linear axis-dependent rotational compensation amounts and linear axis-dependent translational compensation amounts for positions of the two linear axes on the basis of the lattice point compensation vectors, and also divide a one-dimensional coordinate system space of the other one linear axis of the three linear axes at predetermined intervals, store division point compensation vectors having rotational compensation amounts and translational compensation amounts for respective division points at the predetermined intervals, and calculate linear axis-dependent rotational compensation amounts and linear axis-dependent translational compensation amounts for a position of the other one linear axis on the basis of the division point compensation vectors.

The axis-dependent compensation amount calculating unit may divide one-dimensional coordinate system spaces of the respective three linear axes at predetermined intervals, store division point compensation vectors having rotational compensation amounts and translational compensation amounts for respective division points at the predetermined intervals, and calculate linear axis-dependent rotational compensation amounts and linear axis-dependent translational compensation amounts for respective positions of the three linear axes on the basis of the division point compensation vectors.

The command linear axis position and the command rotary axis position may be positions to three linear axes and two rotary axes interpolated on the basis of a program command.

The command linear axis position and the command rotary axis position may be positions of the three linear axes and two rotary axes commanded by a program command.

According to the present invention, compensation amounts corresponding to respective errors are set, thereby a translational compensation amount is obtained from the compensation amounts and the obtained translational compensation amount is added to a command linear axis position, and a rotational compensation amount is also obtained as compensation amounts for the rotary axes and the obtained rotational compensation amounts are added to a command rotary axis position. Accordingly, it is possible to perform high precision machining by moving a tool center point position to a position without any error while also compensating the tool orientation to a direction without any error.

BRIEF DESCRIPTION OF THE DRAWINGS

The aforementioned and other objects and features of the present invention will be apparent from the following description of embodiments with reference to the accompanying drawings, in which.

DETAILED DESCRIPTION OF THE PREFERRED EMBODIMENTS

Embodiments of a numerical controller that controls a five-axis machining tool according to the present invention will be described below with reference to the drawings. Five-axis machining tools are generally classified into three types, which are a "tool head rotary type", a "table rotary type" and a "combined type (in which both a tool head and a table are rotatable)". However, since rotary axes cannot always be controlled in a manner that an error, if any, in a tool orientation (direction) relative to a workpiece is compensated in a "table rotary type" or a "combined type" five-axis machining tool, the invention according to the present application is intended in particular for a "tool head rotary type" five-axis machining tool.

Figure 1:
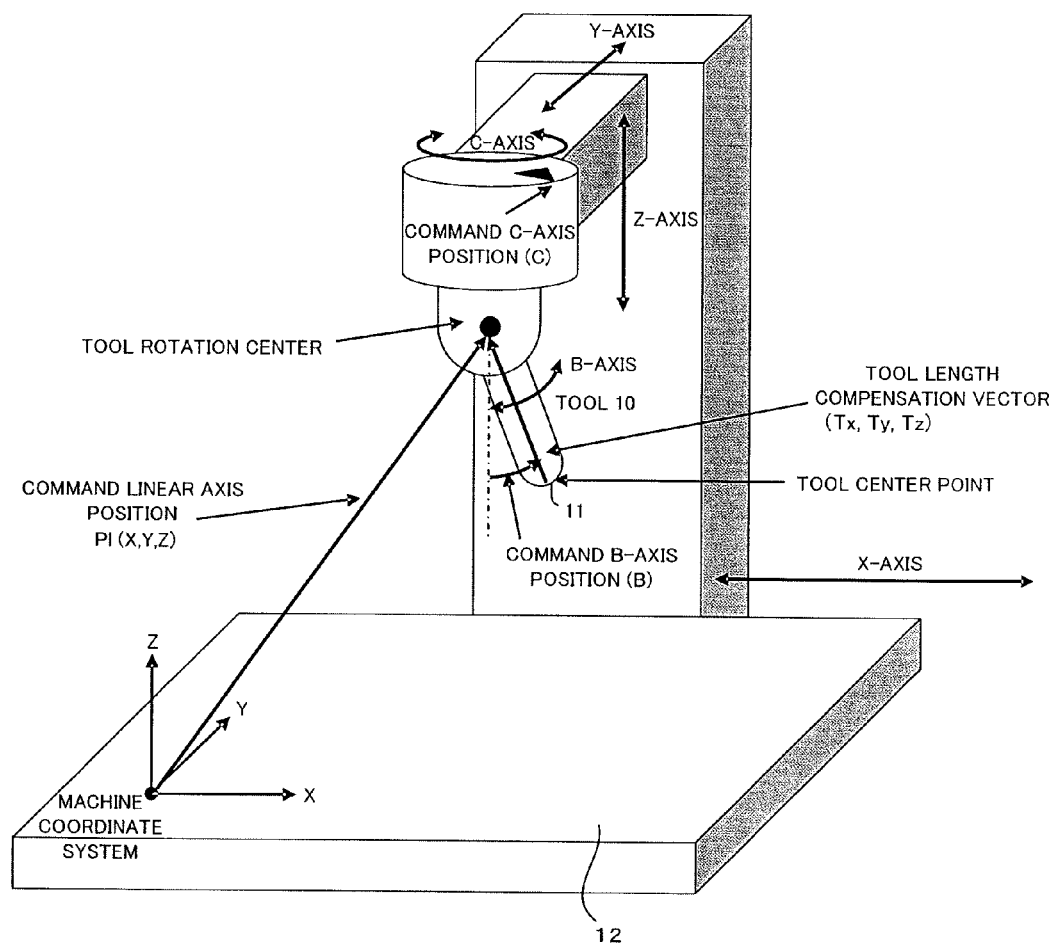
FIG. 1 is a diagram illustrating an example of a tool head rotary type five-axis machining tool having a rotatable tool head and controlled by a numerical controller according to the present invention, in which a B-axis and a C-axis are rotary axes but other combinations such as an A-axis and the C-axis or the A-axis and the B-axis are also possible.

FIG. 1 shows an example of a five-axis machining tool controlled by a numerical controller according to the present invention. The five-axis machining tool shown in FIG. 1 is of a tool head rotary type in which a tool head 11 is rotatable. Here, the rotary axes are B-axis and C-axis. But, there are other cases of A-axis and C-axis, or A-axis and B-axis.

Next, rotational errors and translational errors, and compensation thereof in a tool head rotary type five-axis machining tool will be described with reference to FIG. 2.

Figure 2:
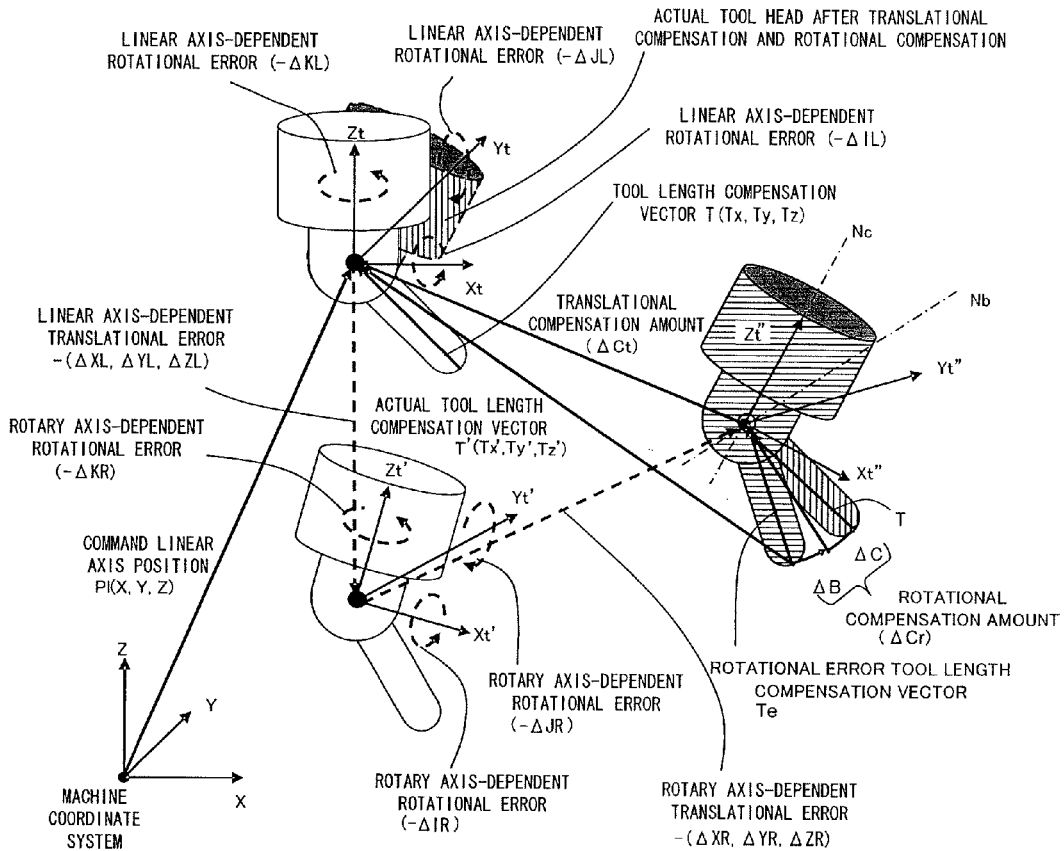
FIG. 2 is a diagram for explaining rotational errors and translational errors, and compensation thereof in the tool head rotary type five-axis machining tool of FIG. 1.

Representing a tool head coordinate system in a (Xt, Yt, Zt) coordinate having the rotation center of a tool head as the origin, FIG. 2 shows that the tool head coordinate system is shifted to a (Xt', Yt', Zt') coordinate due to a linear axis-dependent translational error and a linear axis-dependent rotational error, and further that the tool head coordinate system is shifted to a (Xt'', Yt'', Zt'') coordinate due to a rotary axis-dependent translational error and a rotary axis-dependent rotational error.

In FIG. 2, $-\Delta In$, $-\Delta Jn$ and $-\Delta Kn$ (n=L, R) represent rotational errors around the X-axis, the Y-axis and the Z-axis, respectively, between the coordinate systems. $-\Delta Xn$, $-\Delta Yn$ and $-\Delta Zn$ (n=L, R) represent translational errors in the X-axis direction, the Y-axis direction and the Z-axis direction, respectively, between the coordinate systems. The amounts of the errors are very small, but they are depicted in an exaggerated manner in FIG. 2 to make them easier to understand.

Linear axis-dependent translational compensation amounts and linear axis-dependent rotational compensation amounts based on a command linear axis position Pl(X, Y, Z) are represented by ($\Delta XL$, $\Delta YL$, $\Delta ZL$) and ($\Delta IL$, $\Delta JL$, $\Delta KL$), respectively, and rotary axis-dependent translational compensation amounts and rotary axis-dependent rotational compensation amounts based on a command rotary axis position Pr(B, C) are represented by ($\Delta XR$, $\Delta YR$, $\Delta ZR$) and ($\Delta IR$, $\Delta JR$, $\Delta KR$), respectively. These are referred to as axis-dependent translational compensation amounts and axis-dependent rotational compensation amounts. Since the errors and the compensation amounts are opposite in positive and negative signs with respect to a rotary tool head, the errors are represented by attaching a "negative sign" to the compensation amounts thereof in the drawings and the specification.

A vector $-T'(-Tx', -Ty', -Tz')^T$ which is an inverse of an actual tool length compensation vector $T'(Tx', Ty', Tz')^T$ can be obtained by multiplying a vector $-T(-Tx, -Ty, -Tz)^T$ which is an inverse of a tool length compensation vector $T(Tx, Ty, Tz)^T$ by transformation matrices corresponding to the errors as in the following expression (1). "$T$" described herein represents transposition. However, "$T$" will not be particularly described when the transposition is obvious.

The matrices in the expression (1) are translational and rotational transformation matrices, and ($\Delta IL$, $\Delta JL$, $\Delta KL$) and ($\Delta IR$, $\Delta JR$, $\Delta KR$) are radian units. In addition, on the assumption that the values of the rotational errors ($-\Delta IL$, $-\Delta JL$, $-\Delta KL$) and ($-\Delta IR$, $-\Delta JR$, $-\Delta KR$) are sufficiently small, the respective elements of the matrices in the expression (1) are assumed to satisfy $\sin(-\Delta In)=-\Delta In$, $\sin(-\Delta Jn)=-\Delta Jn$, $\sin(-\Delta Kn)=-\Delta Kn$, $\cos(-\Delta In)=1$, $\cos(-\Delta Jn)=1$, $\cos(-\Delta Kn)=1$ (n=L, R) so that the expression is an approximation in which second or higher-order terms of errors are neglected in expansion into power series of the trigonometric functions. Alternatively, trigonometric functions may of course be used in the transformation matrices without being approximated.

$$\begin{bmatrix} -Tx' \\ -Ty' \\ -Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \quad (1)$$

$$\begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} -Tx \\ -Ty \\ -Tz \\ 1 \end{bmatrix}$$

Alternatively, the following expression (2) can also be obtained instead of the expression (1) by neglecting second-order terms of the errors in the results of multiplication of the transformation matrices.

$$\begin{bmatrix} -Tx' \\ -Ty' \\ -Tz' \\ 1 \end{bmatrix} = \begin{bmatrix} 1 & \Delta KL+\Delta KR & -\Delta JL-\Delta JR & -\Delta XL-\Delta XR \\ -\Delta KL-\Delta KR & 1 & \Delta IL+\Delta IR & -\Delta YL-\Delta YR \\ \Delta JL+\Delta JR & -\Delta IL-\Delta KR & 1 & -\Delta ZL-\Delta ZR \\ 0 & 0 & 0 & 1 \end{bmatrix} \begin{bmatrix} -Tx \\ -Ty \\ -Tz \\ 1 \end{bmatrix} \quad (2)$$

There may be a case in which rotary axis-dependent translational compensation amounts (ΔXR, ΔYR, ΔZR) and rotary $$\begin{bmatrix} -Tx' \\ -Ty' \\ -Tz' \\ 1 \end{bmatrix} =$$

$$\begin{bmatrix} 1-\Delta KL\Delta KR-\Delta JL\Delta JR & \Delta KL+\Delta KR+\Delta JL\Delta IR & -\Delta JL-\Delta JR+\Delta KL\Delta IR & -\Delta XL-\Delta XR-\Delta KL\Delta YR+\Delta JL\Delta ZR \\ -\Delta KL-\Delta KR+\Delta IL\Delta JR & 1-\Delta KL\Delta KR-\Delta IL\Delta IR & \Delta IL+\Delta IR+\Delta KL\Delta IR & -\Delta YL-\Delta YR+\Delta KL\Delta XR-\Delta IL\Delta ZR \\ \Delta JL+\Delta JR+\Delta IL\Delta KR & -\Delta IL-\Delta IR+\Delta JL\Delta KR & 1-\Delta JL\Delta JR-\Delta IL\Delta IR & -\Delta ZL-\Delta ZR-\Delta JL\Delta XR+\Delta IL\Delta YR \\ 0 & 0 & 0 & 1 \end{bmatrix} \begin{bmatrix} -Tx \\ -Ty \\ -Tz \\ 1 \end{bmatrix} \quad (5)$$

axis-dependent rotational compensation amounts (ΔIR, ΔJR, ΔKR) based on a command rotary axis position Pr are more significant than linear axis-dependent translational compensation amounts (ΔXL, ΔYL, ΔZL) and linear axis-dependent rotational compensation amounts (ΔIL, ΔJL, ΔKL) based on a command linear axis position Pl, and the linear axis-dependent translational compensation amounts (ΔXL, ΔYL, ΔZL) and the linear axis-dependent rotational compensation amounts (ΔIL, ΔJL, ΔKL) based on the command linear axis position Pl are negligible. In such case, the matrix containing (ΔXL, ΔYL, ΔZL) and (ΔIL, ΔJL, ΔKL) as elements out of the two transformation matrices on the right side of the expression (1) is deleted as follows, in place of the expression (1) described above. As a result, the following expression (3) is obtained.

$$\begin{bmatrix} -Tx' \\ -Ty' \\ -Tz' \\ 1 \end{bmatrix} = \begin{bmatrix} 1 & \Delta KR & -\Delta JR & -\Delta XR \\ -\Delta KR & 1 & \Delta IR & -\Delta YR \\ \Delta JR & -\Delta IR & 1 & -\Delta ZR \\ 0 & 0 & 0 & 1 \end{bmatrix} \begin{bmatrix} -Tx \\ -Ty \\ -Tz \\ 1 \end{bmatrix} \quad (3)$$

On the other hand, there may be a case in which linear axis-dependent translational compensation amounts (ΔXL, ΔYL, ΔZL) and linear axis-dependent rotational compensation amounts (ΔIL, ΔJL, ΔKL) based on a command linear axis position Pl are more significant than rotary axis-dependent translational compensation amounts (ΔXR, ΔYR, ΔZR) and rotary axis-dependent rotational compensation amounts (ΔIR, ΔJR, ΔKR) based on a command rotary axis position Pr, and the rotary axis-dependent translational compensation amounts (ΔXR, ΔYR, ΔZR) and the rotary axis-dependent rotational compensation amounts (ΔIR, ΔJR, ΔKR) based on the command rotary axis position Pr are negligible. In such case, the matrix containing (ΔXR, ΔYR, ΔZR) and (ΔIR, ΔJR, ΔKR) as elements out of the two transformation matrices on the right side of the expression (1) is deleted as follows, in place of the expression (1). As a result, the following expression (4) is obtained.

$$\begin{bmatrix} -Tx' \\ -Ty' \\ -Tz' \\ 1 \end{bmatrix} = \begin{bmatrix} 1 & \Delta KL & -\Delta JL & -\Delta XL \\ -\Delta KL & 1 & \Delta IL & -\Delta YL \\ \Delta JL & -\Delta IL & 1 & -\Delta ZL \\ 0 & 0 & 0 & 1 \end{bmatrix} \begin{bmatrix} -Tx \\ -Ty \\ -Tz \\ 1 \end{bmatrix} \quad (4)$$

If the multiplication of the two transformation matrices in the expression (1) is done without neglecting the second-order terms of the errors as in the expression (2), the following expression (5) is obtained.

The rotational elements and the translational elements in the expressions (5), (2), (3) and (4) described above are separated and collectively expressed in the following expression (6). Mr represents the rotational elements of the transformation matrix and Mt represents the translational elements of the transformation matrix.

$$\begin{bmatrix} -Tx' \\ -Ty' \\ -Tz' \\ 1 \end{bmatrix} = \begin{bmatrix} Mr & Mt \\ 0\ 0\ 0 & 1 \end{bmatrix} \begin{bmatrix} -Tx \\ -Ty \\ -Tz \\ 1 \end{bmatrix} \quad (6)$$

Based on the expression (6), the relation of T', Mr, T and Mt is expressed by the following expression (7). As will be appreciated from the expressions (5), (2), (3) and (4) described above, Mr is a matrix containing rotational errors.

$$-T'=Mr*(-T)+Mt \quad (7)$$

As shown in the following expression (8), translational compensation amounts ΔCt(ΔX, ΔY, ΔZ) can be obtained by inverting the sign of the translational errors. These amounts are the translational compensation amounts ΔCt in FIG. 2.

$$\Delta Ct=-Mt \quad (8)$$

Here, focusing only on the rotational elements and assuming that a vector obtained by transforming the tool length compensation vector T by the rotational elements Mr is Te(Tex, Tey, Tez), the relation is expressed by the following expression (9). Te represents a rotational error tool length compensation vector based on an erroneous tool orientation (direction) due to rotational errors. (See FIG. 2.)

$$-Te=Mr*(-T) \quad (9)$$

The expression (7) described above can be expressed by the following expression (10) according to FIG. 2.

$$T'=Te+\Delta Ct \quad (10)$$

The rotational error tool length compensation vector Te can be calculated if the rotational errors are provided to the commanded tool length compensation vector T as in the expression (9) described above.

On the other hand, if the relational expression of a transformation matrix Rr containing current positions B and C of the B-axis and the C-axis that are rotary axes and compensation amounts ΔB and ΔC of the B-axis and the C-axis at the positions, the rotational error tool length compensation vector Te and the tool length compensation vector T can be obtained, and if the compensation amounts ΔB and ΔC of the B-axis and the C-axis can be obtained by solving the relational expression, the rotational error tool length compensation vector Te can be transformed to the proper tool length compensation vector T. The amounts ΔB and ΔC are the rotational compensation amounts ΔCr(ΔB, ΔC) for the B-axis and the C-axis to correct the erroneous tool orientation (direction) due to the rotational errors to the commanded tool orientation (direction).

$$Rr*Te=T \quad (11)$$

Here, the relation of Rr, Te and T mentioned above is described. First, a matrix R that turns around a unit vector n(n1, n2, n3) as a rotation center by an angle θ is expressed by the following expression (12). (For example, this is described in David F. Rogers and J. Alan Adams, "MATHEMATICAL ELEMENTS FOR COMPUTER GRAPHICS".)

$$R = \begin{bmatrix} n1^2 + (1-n1^2)*\cos\theta & n1*n2*(1-\cos\theta) - n3*\sin\theta & n1*n3(1-\cos\theta) + n2*\sin\theta \\ n1*n2*(1-\cos\theta) + n3*\sin\theta & n2^2 + (1-n2^2)*\cos\theta & n2*n3*(1-\cos\theta) - n1*\sin\theta \\ n1*n3*(1-\cos\theta) - n2*\sin\theta & n2*n3*(1-\cos\theta) + n1*\sin\theta & n3^2 + (1-n3^2)*\cos\theta \end{bmatrix} \quad (12)$$

Rr in the expression (11) described above represents a matrix that turns around a direction Nb, which is obtained by turning the Y-axis direction by the current position C of the C-axis and further turning by the error amount of Mr, as a rotation center, by ΔB, and thereafter turns around a direction Nc, which is obtained by turning the Z-axis direction by the error amount of Mr, as a rotation center, by ΔC (see FIG. 2).

Figure 3:
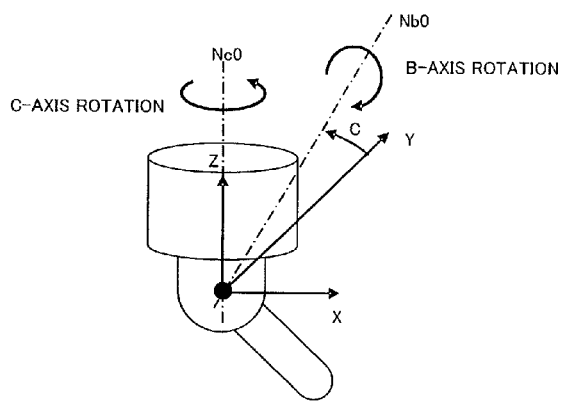
FIG. 3 is a diagram for explaining that if it is considered that no rotational error due to a rotational element Mr of a transformation matrix is present, the rotation center of a B-axis is in a direction (Nb0) obtained by turning a Y-axis direction, which is the rotation center of the B-axis when C=0 is met, by C and the rotation center of a C-axis is Nc0 that is a Z-axis direction.

The directions Nb and Nc are obvious based on the facts that if it is considered that no rotational error due to Mr is present, the rotation center of the B-axis is a direction (Nb0) obtained by turning the Y-axis direction, which is the rotation center of the B-axis when C=0, by C as shown in FIG. 3, and the rotation center of the C-axis, on the other hand, is a direction Nc0, which is the Z-axis direction, and that Nb and Nc actually have rotational errors due to Mr with respect to the rotation centers (Nb0, Nc0) without any error. Thus, Nb is expressed by the following expression (13), and Nc is expressed by the following expression (14). Here, it is supposed that the orthogonal relation between Nb and Nc is kept.

$$Nb = Mr * \begin{bmatrix} \cos C & -\sin C & 0 \\ \sin C & \cos C & 0 \\ 0 & 0 & 1 \end{bmatrix} \begin{bmatrix} 0 \\ 1 \\ 0 \end{bmatrix} \quad (13)$$

$$Nc = Mr * \begin{bmatrix} 0 \\ 0 \\ 1 \end{bmatrix} \quad (14)$$

Using the expression (12) described above, a matrix Rb that turns around Nb as a rotation center by ΔB is expressed by the following expression (15), and a matrix Rc that turns around Nc as a rotation center by ΔC is expressed by the following expression (16). In the expressions, approximation is made as cos(Δα)=1 and sin(Δα)=Δα (α=B, C) and second or higher-order terms of errors are neglected. Alternatively, the calculation may of course be made without such approximation.

$$Rb = \begin{bmatrix} 1 & 0 & \cos C*\Delta B \\ 0 & 1 & \sin C*\Delta B \\ -\cos C*\Delta B & -\sin C*\Delta B & 1 \end{bmatrix} \quad (15)$$

$$Rc = \begin{bmatrix} 1 & -\Delta C & 0 \\ \Delta C & 1 & 0 \\ 0 & 0 & 1 \end{bmatrix} \quad (16)$$

Accordingly, Rr is expressed by the following expression (17) as a product of Rc and Rb.

$$Rr = Rc * Rb \quad (17)$$

$$= \begin{bmatrix} 1 & -\Delta C & \cos C*\Delta B \\ \Delta C & 1 & \sin *C*\Delta B \\ -\cos C*\Delta B & -\sin *C*\Delta B & 1 \end{bmatrix}$$

By applying Rr in the expression (11) described above, simultaneous equations shown in the following expression (18) are obtained.

$$Tex - \Delta C*Tey + \cos C*\Delta B*Tez = Tx(1)$$

$$\Delta C*Tex + Tey + \sin C*\Delta B*Tez = Ty(2)$$

$$-\cos C*\Delta B*Tex - \sin C*\Delta B*Tey + Tez = Tz(3) \quad (18)$$

ΔB and ΔC can be obtained from the simultaneous equations. Specifically, ΔB is obtained by the following expression (19) based on the equation (3) in the expression (18).

$$\Delta B = \frac{Tez - Tz}{\cos C * Tex + \sin C * Tey} \quad (19)$$

When ΔB is thus obtained, ΔC can be obtained by the equation (1) or (2) in the expression (18) described above. For example, ΔC is obtained by the following expression (20) based on the equation (1).

$$\Delta C = \frac{Tex - Tx + \cos C * \Delta B * Tez}{Tey} \quad (20)$$

The rotational compensation amounts ΔCr(ΔB, ΔC) to correct the rotational error tool compensation vector T to the originally commanded tool length compensation vector can be obtained from these values. Then, the translational compensation amounts ΔCt(ΔX, ΔY, ΔZ) are added to the command linear axis position Pl(X, Y, Z) to obtain a corrected linear axis position Pl'(X', Y', Z'), and the rotational compensation amounts ΔCr(ΔB, ΔC) are added to the command rotary axis position Pr(B, C) to obtain a corrected rotary axis position Pr'(B', C'), so that the axes are driven to the respective corrected axis positions. Accordingly, the tool center point position can be moved to a position without any error while also moving the tool orientation (direction) to a direction without any error.

Specifically, the proper tool head position with respect to the command linear axis position Pl(X, Y, Z) is a position on the (Xt, Yt, Zt) coordinate but the actual tool head position is a position on the (Xt", Yt", Zt") coordinate due to errors, as shown in FIG. 2. Accordingly, by carrying out correction with the translational compensation amounts ΔCt(ΔX, ΔY, Z) and the rotational compensation amounts ΔCr(ΔB, ΔC), the actual tool head is moved from the position shown by horizontal stripes to the position shown by vertical stripes in FIG. 2 and the tool orientation becomes the orientation as commanded. As a result, the tool center point position can be moved to a position without any error while also turning the tool orientation to an orientation without any error.

It should be noted that the denominator and the numerator in the expressions (19) and (20) described above contain tool length compensation vector elements or rotational error tool length compensation vector elements. Thus, it is also possible to calculate a directional vector of only directional components of the tool length compensation vectors by dividing the denominator and the numerator by the length of the tool length compensation vectors. Specifically, if the directional vector of T is represented by (it, jt, kt) and the directional vector of Te is represented by (ite, jte, kte), it is also possible to replace the elements of T and Te in the expressions (19) and (20) described above by those of the directional vectors.

Next, setting and calculation of compensation amounts will be described.

An embodiment for obtaining linear axis-dependent translational compensation amounts (ΔXL, ΔYL, ΔZL) and linear axis-dependent rotational compensation amounts (ΔIL, ΔJL, ΔKL) based on a command linear axis position Pl(X, Y, Z), and rotary axis-dependent translational compensation amounts (ΔXR, ΔYR, ΔZR) and rotary axis-dependent rotational compensation amounts (ΔIR, ΔJR, ΔKR) based on a command rotary axis position Pr(B, C) will be described.

First, a method for obtaining the linear axis-dependent translational compensation amounts (ΔXL, ΔYL, ΔZL) and the linear axis-dependent rotational compensation amounts (ΔIL, ΔJL, ΔKL) based on the command linear axis position Pl(X, Y, Z) will be described.

Figure 4:
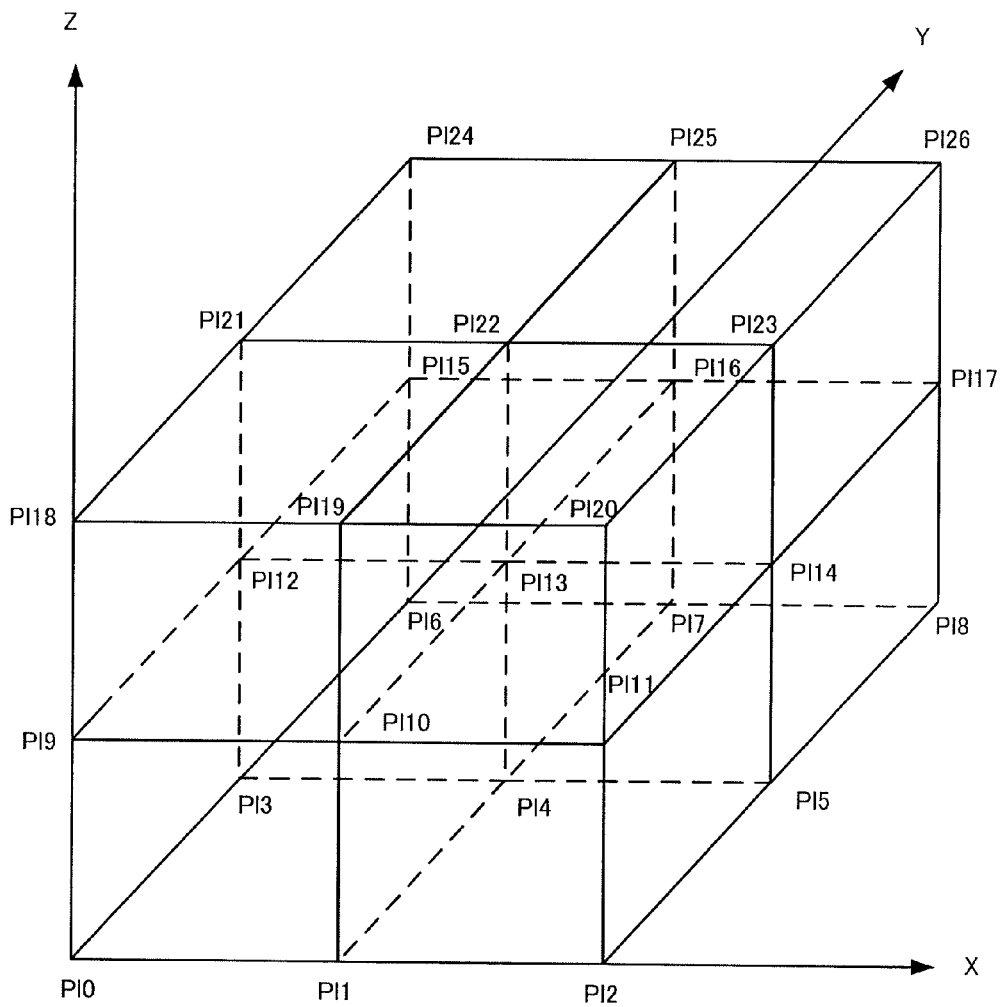
FIG. 4 is a diagram showing a three-dimensional coordinate system divided into lattice regions.

FIG. 4 is a diagram showing a three-dimensional coordinate system divided into lattice regions. The three-dimensional coordinate system is divided into a regular lattice. Points of intersection of borderlines dividing into a lattice are referred to as lattice points Pl0 to Pl26. It should be noted that only a part of the coordinate system in shown in FIG. 4, and in practice, the entire region in which a machine is movable is divided into a lattice. It should also be noted that the lattice intervals do not have to be regular. For example, lattice positions on the respective axes such as X-axis positions of lattice points Pl0, Pl1, Pl2 on the X-axis, Y-axis positions of lattice points Pl0, Pl3, Pl6 on the Y-axis, and Z-axis positions of lattice points Pl0, Pl9, Pl18 on the Z-axis may be set as set values.

Errors (translational error and rotational error) caused by a mechanical system at the lattice points are measured in advance. The method for the measurement is not described in detail herein. A vector having the same absolute value as and the direction opposite to an error caused by the mechanical system at a lattice point is referred to as a "lattice point compensation vector". Thus, the compensation amounts are represented by a six-dimensional vector Un(UnX, UnY, UnZ, UnI, UnJ, UnK: n=0 to 26). (UnX, UnY, UnZ) correspond to the linear axis-dependent translational compensation amounts (ΔXL, ΔYL, ΔZL), while (UnI, UnJ, UnK) correspond to the linear axis-dependent rotational compensation amounts (ΔIL, ΔJL, ΔKL). The lattice point compensation vectors are stored in a non-volatile memory or the like provided in the numerical controller in a form of a linear axis-dependent compensation amount table. If the division into a lattice is made into too small regions, the data amount of the lattice point compensation vectors become large, thus requiring a large storage capacity of the memory. Therefore, the number of lattice points with which a compensation amount that is as correct as possible can be calculated while suppressing the data amount small is about several tens per axis.

Here, a method for calculating linear axis-dependent translational compensation amounts (ΔXL, ΔYL, ΔZL) and linear axis-dependent rotational compensation amounts (ΔIL, ΔJL, ΔKL) based on a given command linear axis position Pl(X, Y, Z) will be described.

Figure 5:
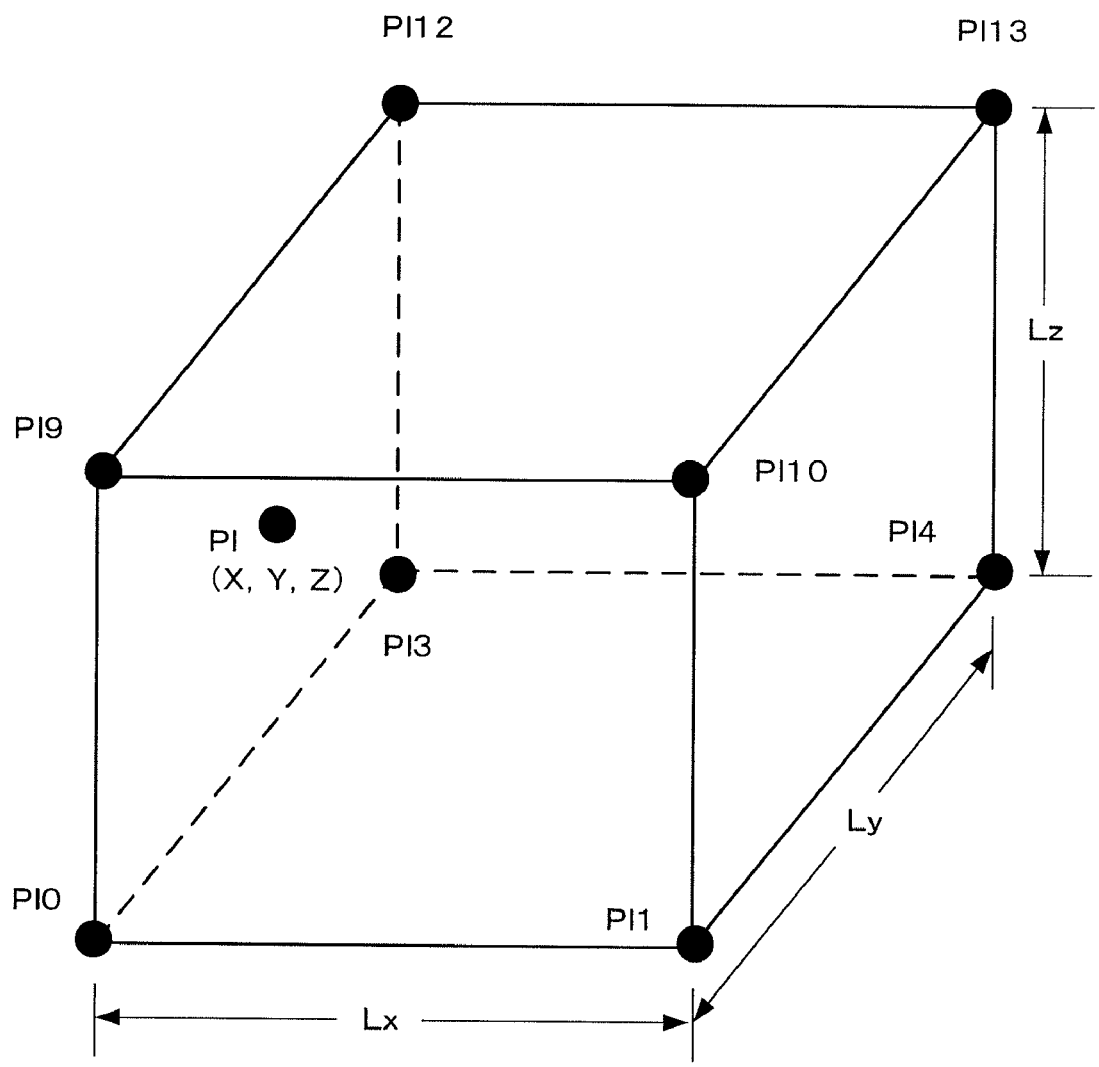
FIG. 5 is a diagram showing a lattice region containing a command linear axis position Pl(X, Y, Z) for which a compensation vector is to be calculated.

FIG. 5 is a diagram showing a lattice region containing a command linear axis position Pl(X, Y, Z) for which a compensation vector is to be calculated. In the example of FIG. 5, the command linear axis position Pl(X, Y, Z) for which a compensation vector is to be calculated is present in a region defined by the lattice points Pl0, Pl1, Pl3, Pl4, Pl9, Pl110, Pl112 and Pl13.

The lattice intervals of the X-axis, the Y-axis and the Z-axis are Lx, Ly and Lz, respectively. In addition, lattice point compensation vectors U0(U0X, U0Y, U0Z, U0I, U0J, U0K), U1(U1X, U1Y, U1Z, U1I, U1J, U1K) . . . U13(U13X, U13Y, U13Z, U13I, U13J, U13K) are set for the lattice points Pl0, Pl1, Pl3, Pl4, Pl9, Pl110, Pl112, Pl13, respectively. Hereinafter, this region is assumed to be a vector field having linearity in which the lattice point compensation vectors corresponding to the respective lattice points are given at the lattice point positions.

When a region containing the point Pl(X, Y, Z) is obtained, the lattice point Pl0(Pl0x, Pl0y, Pl0z) is determined as a reference point. Next, to obtain a compensation vector for the point Pl, the position in the lattice is first normalized to [0, 1]. The normalized coordinate values (x, y, z) of the point Pl are determined by the following expressions (21) to (23) where the lattice intervals of the X-axis, the Y-axis and the Z-axis are Lx, Ly and Lz, respectively.

$$x = (X - Pl0x)/Lx \quad (21)$$

$$y = (Y - Pl0y)/Ly \quad (22)$$

$$z = (Z - Pl0z)/Lz \quad (23)$$

A compensation vector ΔLc(ΔXL, ΔYL, ΔZL, ΔIL, ΔJL, ΔKL) at the point Pl is calculated by the following expression (24) based on the coordinate values (x, y, z).

$$\Delta\alpha L = U0\alpha + (1-x)(1-y)(1-z) + U1\alpha \cdot x(1-y)(1-z) + \quad (24)$$
$$U4\alpha \cdot xy(1-z) + U3\alpha \cdot (1-x)y(1-z) + U9\alpha \cdot (1-x)(1-y)z +$$
$$U10\alpha \cdot x(1-y)z + U13\alpha \cdot xyz + U12\alpha \cdot (1-x)yz$$
$$(\alpha = X, Y, Z, I, J, K)$$

In this manner, the linear axis-dependent translational compensation amounts (ΔXL, ΔYL, ΔZL) and the linear axis-dependent rotational compensation amounts (ΔIL, ΔJL, ΔKL) at the given point Pl(X, Y, Z) of the linear axis coordinate system can be calculated.

In the above, the three-dimensional coordinate system is divided into a lattice as shown in FIG. 4 and the compensation amount vector at the position of the point Pl on the three linear axes are obtained from the lattice point compensation vectors at the lattice points. Alternatively, it is also possible to combine a two-dimensional coordinate system and a one-dimensional coordinate system, which will be described later, and obtain the compensation amount vector as a compensation amount vector at a position of the point Pl on two linear axes and a compensation amount vector at a position of the point Pl on the other linear axis. Further alternatively, it is also possible to combine one-dimensional coordinate systems, and obtain the compensation amount vector as a compensation amount vector at a position of the point Pl on one linear axis, a compensation amount vector at a position thereof of another linear axis, and a compensation amount vector at a position thereof of the other linear axis.

Next, a method for obtaining rotary axis-dependent translational compensation amounts (ΔXR, ΔYR, ΔZR) and rotary axis-dependent rotational compensation amounts (ΔIR, ΔJR, ΔKR) based on a command rotary axis position Pr(B, C) will be described.

Figure 6:
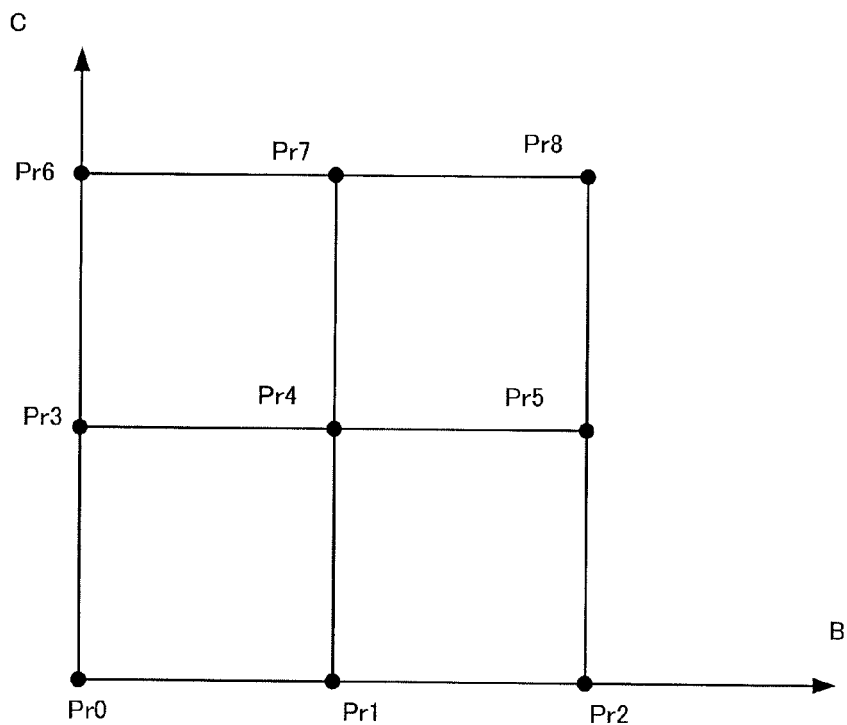
FIG. 6 is a diagram showing a two-dimensional coordinate system divided into lattice regions.

FIG. 6 is a diagram showing a two-dimensional coordinate system divided into lattice regions. The two-dimensional coordinate system is divided into a regular lattice. Points of intersection of borderlines dividing into a lattice are referred to as lattice points Pr0 to Pr8. It should be noted that only a part of the coordinate system in shown in FIG. 6, and in practice, the entire region in which a machine is movable is divided into a lattice. It should also be noted that the lattice intervals do not have to be regular similarly to the description referring to FIG. 4. For example, lattice positions on the respective axes such as B-axis positions of lattice points Pr0, Pr1, Pr2 on the B-axis and C-axis positions of lattice points Pr0, Pr3, Pr6 on the C-axis may be set as set values.

Errors (translational error and rotational error) caused by a mechanical system at the lattice points are measured in advance. A vector having the same absolute value as and the direction opposite to a measured error is referred to as a "lattice point compensation vector". Thus, the compensation amounts are represented by a six-dimensional vector Vn(VnX, VnY, VnZ, VnI, VnJ, VnK: n=0 to 8). (VnX, VnY, VnZ) correspond to the rotary axis-dependent translational compensation amounts (ΔXR, ΔYR, ΔZR), and (VnI, VnJ, VnK) correspond to the rotary axis-dependent rotational compensation amounts (ΔIR, ΔJR, ΔKR). The lattice point compensation vectors are stored in a non-volatile memory or the like in a form of a rotary axis-dependent compensation amount table. Here, a method for calculating rotary axis-dependent translational compensation amounts (ΔXR, ΔYR, ΔZR) and rotary axis-dependent rotational compensation amounts (ΔIR, ΔJR, ΔKR) based on a given command rotary axis position Pr(B, C) will be described.

Figure 7:
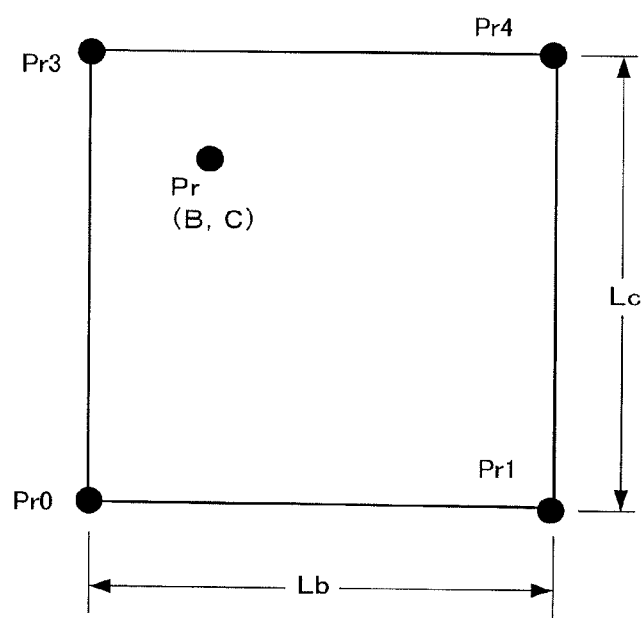
FIG. 7 is a diagram showing a lattice region containing a command rotary axis position Pr(B, C) for which a compensation vector is to be calculated.

FIG. 7 is a diagram showing a lattice region containing a command rotary axis position Pr(B, C) for which a compensation vector is to be calculated. In the example of FIG. 7, the command rotary axis position Pr(B, C) for which a compensation vector is to be calculated is present in a region defined by the lattice points Pr0, Pr1, Pr3 and Pr4.

In addition, lattice point compensation vectors V0(V0X, V0Y, V0Z, V0I, V0J, V0K), V1(V1X, V1Y, V1Z, V1I, V1J, V1K) ... V4(V4X, V4Y, V4Z, V4I, V4J, V4K) are set for the lattice points Pr0, Pr1, Pr3, Pr4, respectively. Hereinafter, this region is assumed to be a vector field having linearity in which the lattice point compensation vectors corresponding to the respective lattice points are given at the lattice point positions.

When a region containing the command rotary axis point Pr(B, C) is obtained, the lattice point Pr0(Pr0b, Pr0c) is determined as a reference point. Next, to obtain a compensation vector for the point Pr, the position in the lattice is first normalized to [0, 1]. The normalized coordinate values (b, c) of the point Pr are determined by the following expressions (25) to (26) where the lattice intervals of the B-axis and the C-axis are Lb and Lc, respectively.

$$b = (B - Pr0b)/Lb \quad (25)$$

$$c = (C - Pr0c)/Lc \quad (26)$$

A compensation vector ΔRc(ΔXR, ΔYR, ΔZR, ΔIR, ΔJR, ΔKR) at the point Pr is calculated by the following expression (27) based on the coordinate values (b, c).

$$\Delta\alpha R = \quad (27)$$
$$V0\alpha \cdot (1-b)(1-c) + V1\alpha \cdot b(1-c) + V3\alpha \cdot (1-b)c + V4\alpha \cdot b \cdot c$$
$$(\alpha = X, Y, Z, I, J, K)$$

In this manner, the rotary axis-dependent translational compensation amounts (ΔXR, ΔYR, ΔZR) and the rotary axis-dependent rotational compensation amounts (ΔIR, ΔJR, ΔKR) at the given point Pr(B, C) on the rotary axis coordinate system can be calculated. In the above, the two-dimensional coordinate system is divided into a lattice as shown in FIG. 6 and the compensation amount vector at the position of the point Pr on the two linear axes are obtained from the lattice point compensation vectors at the lattice points. Alternatively, it is also possible to combine one-dimensional coordinate systems, which will be described later, and obtain the compensation amount vector as a compensation amount vector at a position of the point Pr on one rotary axis and a compensation amount vector at a position thereof on the other rotary axis.

Figure 8:
FIG. 8 is a diagram showing a one-dimensional coordinate system of the B-axis divided at predetermined intervals.

FIG. 8 is a diagram showing a one-dimensional coordinate system of the B-axis divided at predetermined intervals. The division points dividing at predetermined intervals are represented by Pb0, Pb1 and Pb2. It should be noted that only a part of the coordinate system is shown in FIG. 8, and in practice, the entire region in which a machine is movable is divided at predetermined intervals. It should also be noted that the intervals of the division points do not have to be regular similarly to the description referring to FIGS. 4 and 6. For example, the positions of the division points Pb0, Pb1 and Pb2 on the B-axis may be set as set values.

Errors (translational error and rotational error) caused by a mechanical system at the division points are measured in advance. A vector having the same absolute value as and the direction opposite to a measured error is referred to as a "division point compensation vector". Thus, the compensation amounts are represented by a six-dimensional vector Vn(VnX, VnY, VnZ, VnI, VnJ, VnK: n=0 to 2). (VnX, VnY, VnZ) correspond to the B-axis-dependent translational compensation amounts (ΔXB, ΔYB, ΔZB), and (VnI, VnJ, VnK) correspond to the B-axis-dependent rotational compensation amounts (ΔIB, ΔJB, ΔKB). The division point compensation vectors are stored in a non-volatile memory or the like in a form of a B-axis-dependent compensation amount table.

Figure 9:
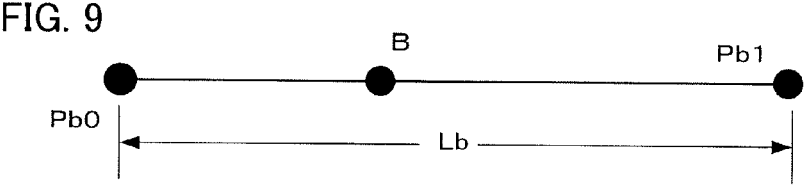
FIG. 9 is a diagram showing a divided region containing a command B-axis position B for which a compensation vector is to be calculated.

FIG. 9 is a diagram showing a divided region containing a command B-axis position B for which a compensation vector is to be calculated. In the example of FIG. 9, the command B-axis position B for which a compensation vector is to be calculated is present in a region defined by the division points Pb0 and Pb1. In addition, division point compensation vectors V0(V0X, V0Y, V0Z, V0I, V0J, V0K) and V1(V1X, V1Y, V1Z, V1I, V1J, V1K) are set for the division points Pb0 and Pb1, respectively. A normalized coordinate value b of the point B is determined by the following expression (28) where the division interval of the B-axis is Lb.

$$b=(B-Pb0)/Lb \quad (28)$$

The B-axis-dependent translational compensation amounts (ΔXB, ΔYB, ΔZB) and the B-axis-dependent rotational compensation amounts (ΔIB, ΔJB, ΔKB) at the point B are calculated by the following expression (29) based on the coordinate value b.

$$\Delta\alpha B = V0\alpha \cdot (1-b) + V1\alpha \cdot b$$
$$(\alpha = X, Y, Z, I, J, K). \quad (29)$$

In this manner, the compensation vector at the given point B on the B-axis coordinate system can be calculated.

Figure 10:
FIG. 10 is a diagram showing that a C-axis-dependent translational compensation amount and a C-axis-dependent rotational compensation amount at a given point on a C-axis coordinate system are calculated based on a C-axis-dependent compensation table.

In a similar manner, C-axis-dependent translational compensation amounts (ΔXC, ΔYC, ΔZC) and C-axis-dependent rotational compensation amounts (ΔIC, ΔJC, ΔKC) at a given point C on a C-axis coordinate system can be calculated based on a C-axis-dependent compensation table set as shown in FIG. 10.

It is also possible to perform compensation by combining division point compensation vectors in such one-dimensional coordinate systems for the respective two rotary axes. Further, although the linear axis-dependent compensation amounts are lattice point compensation vectors obtained by dividing the three-dimensional coordinate system into a three-dimensional lattice as in FIG. 4, it is also possible to perform the compensation in combination by separating the coordinate system into two linear axes having high correlation coefficients therebetween and one axis having a low correlation coefficient therewith, and the compensation amounts dependent on the two linear axes showing high correlation coefficients are obtained as lattice point compensation vectors which are divided into a two-dimensional lattice as shown in FIG. 6, and the compensation amounts dependent on the one axis showing low correlation coefficient is obtained as a division point compensation vector in a one-dimensional coordinate system as shown in FIG. 8. Alternatively, it is also possible to obtain the compensation amounts only as the lattice point compensation vectors which are divided into the two-dimensional lattice without using the division point compensation vector in the one-dimensional coordinate system among the compensation vectors.

Further, it is also possible to perform compensation by combining the division point compensation vectors in one-dimensional coordinate systems as shown in FIG. 8 for the respective three linear axes. Alternatively, it is also possible to perform compensation by combining division point compensation vector(s) for only one axis or two axes among them.

Figure 11:
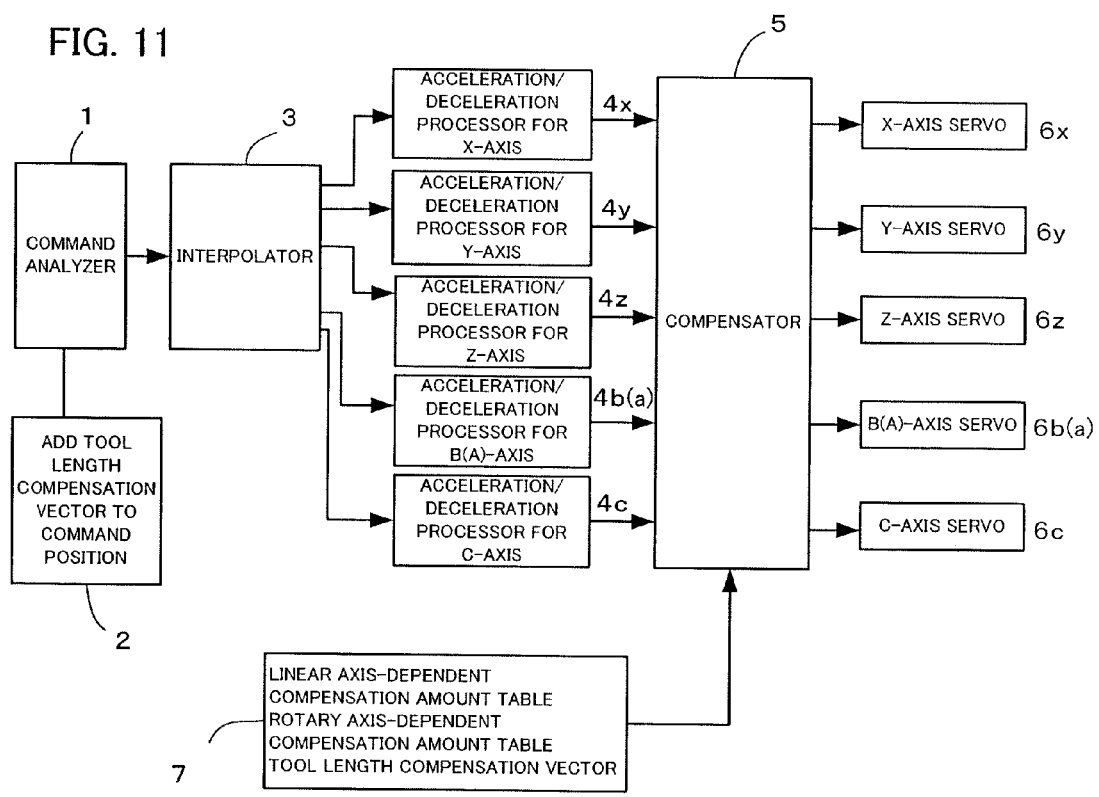
FIG. 11 is a block diagram of a main part of a first embodiment of the numerical controller that controls a five-axis machining tool according to the present invention.

FIG. 11 is a block diagram of a main part of a first embodiment of the numerical controller that controls a five-axis machining tool of the present invention. In the first embodiment, a tool length compensation command is applied to the numerical controller. In the first embodiment, a program block is analyzed at a command analyzer 1, and a tool length compensation vector T(Tx, Ty, Tz) is added to a command position of a tool center point position, which is the analysis result, by a tool length compensation vector adding element 2 to obtain a linear axis machine coordinate position to which the tool length compensation vector has been added.

The linear axis machine coordinate position and commanded turning positions of rotary axes are interpolated by an interpolator 3 to produce machine coordinate positions for the respective axes, and acceleration/deceleration processing is performed at each of acceleration/deceleration processors 4x, 4y, 4z, 4b(a) and 4c for the respective axes (X, Y, Z, B (A), C axes). Then, the translational compensation amounts obtained by the expressions (1) to (6) and (8) described above are added to the command linear axis position Pl(X, Y, Z) at a compensator 5 after finishing the acceleration/deceleration processing for the respective axes to obtain a corrected linear axis position Pl'(X', Y', Z'). In addition, the rotational compensation amounts obtained by the expressions (1) to (6), (9) and (13) to (20) described above are added to the commanded rotary axis position Pr(B, C) at the compensator 5 after finishing the acceleration/deceleration processing for the respective axes to obtain a corrected rotary axis position Pr'(B', C').

Then, servomotors 6x, 6y, 6z, 6b(a) and 6c are driven to the corrected linear axis position Pl'(X', Y', Z') for the X-axis, the Y-axis and the Z-axis, which are linear axes, and to the corrected rotary axis position Pr'(B', C') for the B (A)-axis and the C-axis, which are rotary axes. Information of the linear axis-dependent compensation amounts, the rotary axis-dependent compensation amounts and the tool length compensation vector, which is used in the expressions (1) to (5) described above, is stored in an input data unit 7 in advance. Information from the tool length compensation vector adding element 2 is used as the information of the tool length compensation vector.

Figure 12:
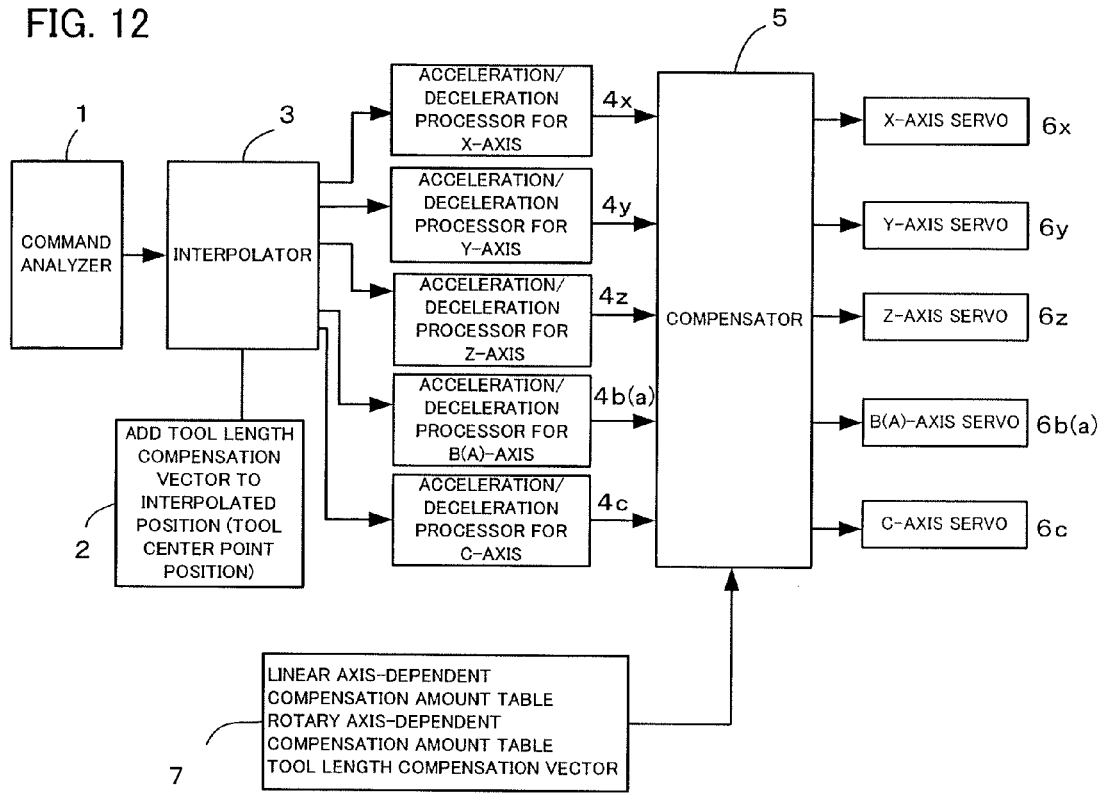
FIG. 12 is a block diagram of a main part of a second embodiment of the numerical controller that controls a five-axis machining tool according to the present invention.

FIG. 12 is a block diagram of a main part of a second embodiment of the numerical controller that controls a five-axis machining tool of the present invention. In the second embodiment, a tool center point control is applied to the numerical controller.

In this embodiment, a program block is analyzed at a command analyzer 1 to obtain a command tool center point position, the obtained command tool center point position is interpolated by an interpolator 3, and a tool compensation vector T(Tx, Ty, Tz) is added to the thus interpolated tool center point position by a tool length compensation vector adding element 2. The addition result is subjected to acceleration/deceleration processing at acceleration/deceleration processors for the respective axes to obtain a command linear axis position Pl(X, Y, Z). Then, the translational compensation amounts obtained by the expressions (1) to (6) and (8) described above are added to the command linear axis position Pl(X, Y, Z) at a compensator 5 to obtain a corrected linear axis position Pl'(X', Y', Z'). On the other hand, the rotational compensation amounts obtained by the expressions (1) to (6), (9) and (13) to (20) described above are added to the command rotary axis position Pr(B, C) at the compensator 5 after the acceleration/deceleration processing by the acceleration/deceleration processors for the respective axes to obtain a corrected rotary axis position Pr'(B', C').

Then, servomotors 6x, 6y and 6z are driven to the corrected linear axis position Pl'(X', Y', Z') for the X-axis, the Y-axis and the Z-axis, which are linear axes, and servomotors 6b(a) and 6c are driven to the corrected rotary axis position Pr'(B', C') for the B(A)-axis and the C-axis, which are rotary axes.

Information of the linear axis-dependent compensation amounts, the rotary axis-dependent compensation amounts and the tool length compensation vector, which are used in the expressions (1) to (5) described above at the compensator 5, is stored in an input data unit 7 in advance. Information from the tool length compensation vector adding element 2 is used as the information of the tool length compensation vector.

Figure 13:
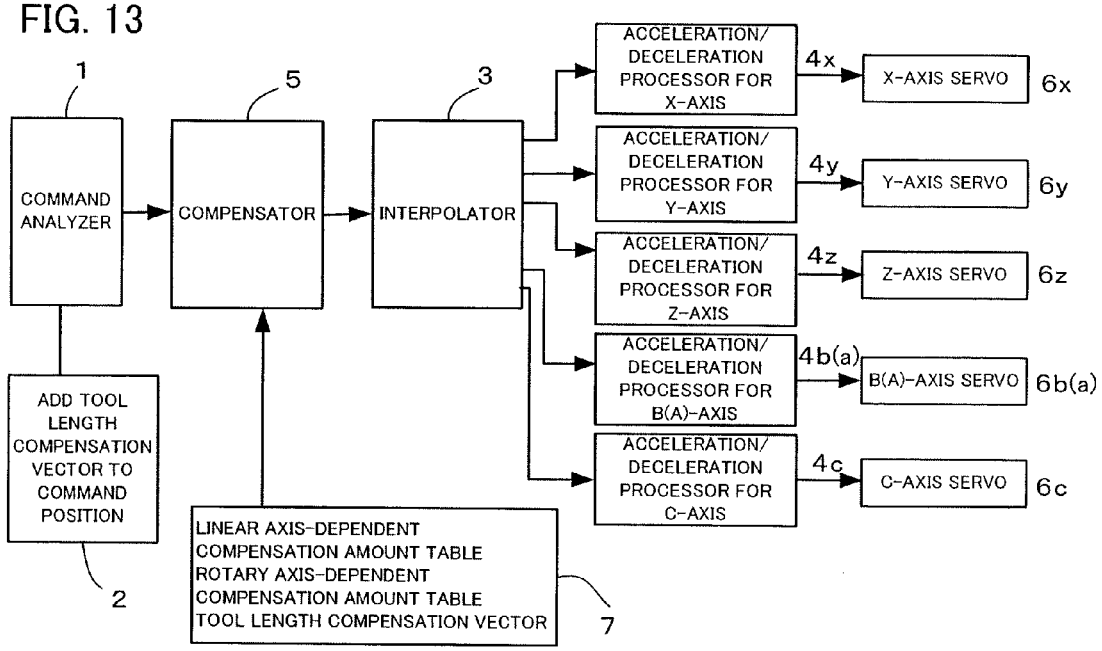
FIG. 13 is a block diagram of a main part of a third embodiment of the numerical controller that controls a five-axis machining tool according to the present invention.

FIG. 13 is a block diagram of a main part of a third embodiment of the numerical controller that controls a five-axis machining tool of the present invention. In the third embodiment, a tool length compensation command is applied to the numerical controller.

In the third embodiment, a program block is analyzed at a command analyzer 1 to obtain a command tool center point position, and a tool length compensation vector T(Tx, Ty, Tz) is added to the obtained command tool center point position by a tool length compensation vector adding element 2 to obtain a command linear axis position Pl(X, Y, Z) to which the tool length compensation vector is added.

Then, the translational compensation amounts obtained by the expressions (1) to (6) and (8) described above are added to the command linear axis position Pl(X, Y, Z) at a compensator 5 to obtain a corrected linear axis position Pl'(X', Y', Z'). In addition, the rotational compensation amounts obtained by the expressions (1) to (6), (9) and (13) to (20) described above are added to the command rotary axis position Pr(B, C) at the compensator 5 to obtain a corrected rotary axis position Pr' (B', C').

The corrected linear axis position and the corrected rotary axis position are interpolated at an interpolator 3, the thus interpolated positions of the respective axes (X, Y, Z, B(A), C axes) are subjected to acceleration/deceleration processing respectively by acceleration/deceleration processors 4x, 4y, 4z, 4b(a) and 4c, and after finishing the acceleration/deceleration processing, servomotors 6x, 6y, 6z, 6b(a) and 6c for the respective axes are driven to the positions of the respective axes.

Figure 14:
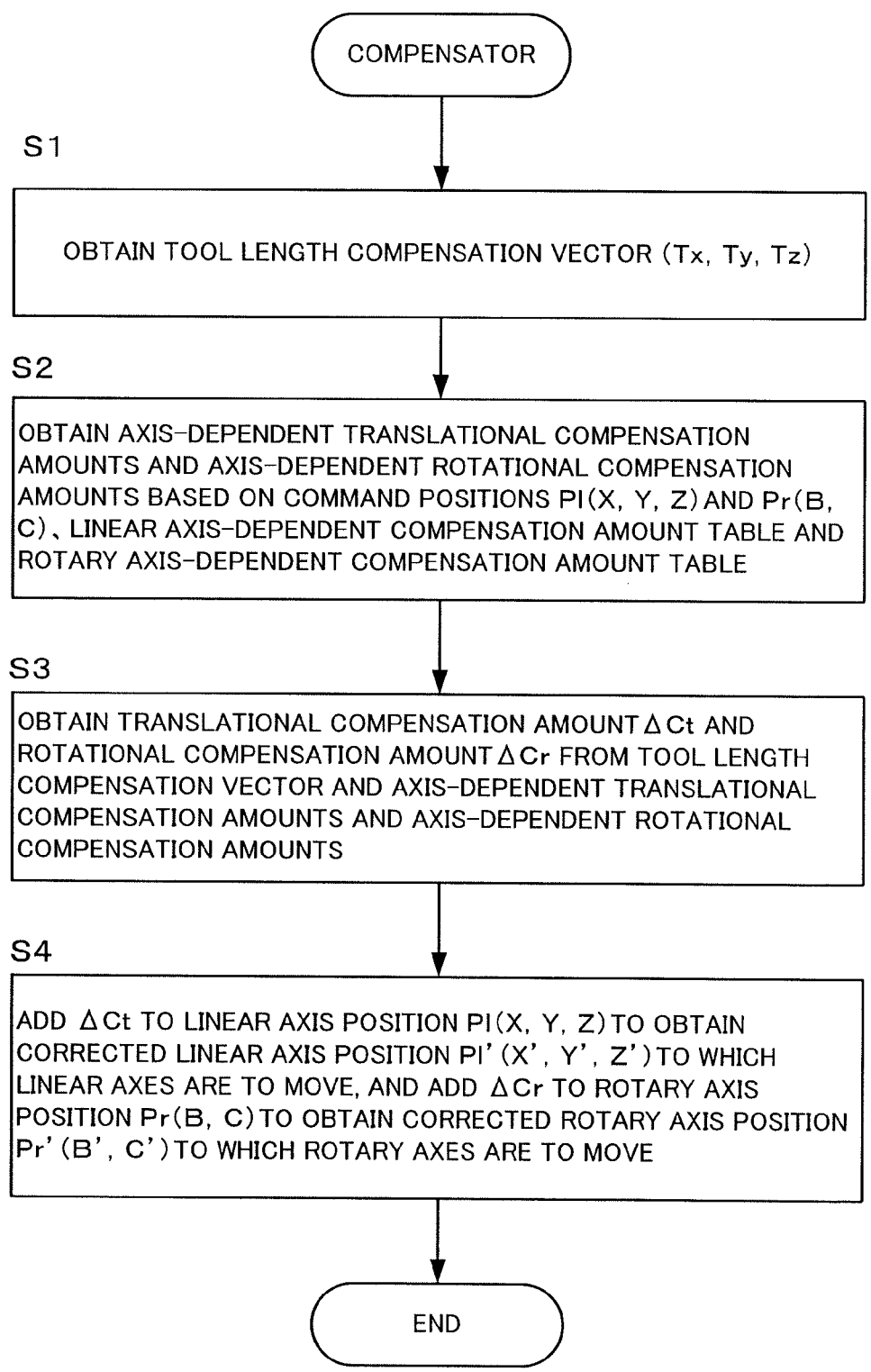
FIG. 14 is a flowchart showing a compensation algorithm implemented in the first embodiment of the numerical controller of the present invention.

FIG. 14 is a flowchart showing a compensation algorithm implemented in the first embodiment of the numerical controller of the present invention. The algorithm will be described according to respective steps as follows.

[Step S1] A tool length compensation vector (Tx, Ty, Tz) is obtained.

[Step S2] Axis-dependent translational compensation amounts and axis-dependent rotational compensation amounts are obtained using the expressions (21) to (27) based on the command linear axis position Pl(X, Y, Z) and the command rotary axis position Pr(B, C), the linear axis-dependent compensation amount table and the rotary axis-dependent compensation amount table.

[Step S3] Translational compensation amounts ΔCt and rotational compensation amounts ΔCr are calculated using the expressions (1) to (20) based on the tool length compensation vector (Tx, Ty, Tz) obtained in step S1 and the axis-dependent translational compensation amounts and the axis-dependent rotational compensation amounts obtained in step S2.

[Step S4] The translational compensation amounts ΔCt calculated in step S3 are added to the command linear axis position Pl(X, Y, Z) to obtain machine coordinate positions to which the linear axes are to move (corrected linear axis position Pl'(X', Y', Z')). In addition, ΔCr is added to the rotary axis position Pr(B, C) to obtain machine coordinate positions to which the rotary axes are to move (corrected rotary axis position Pr'(B', C')).

The invention claimed is:

1. A numerical controller for controlling a five-axis machining tool that machines a workpiece mounted on a table using three linear axes and two rotary axes, the numerical controller comprising:
   an axis-dependent compensation amount calculating unit that obtains an axis-dependent translational compensation amount and an axis-dependent rotational compensation amount on the basis of a commanded axis position;
   a translational compensation amount calculating unit that obtains a translational compensation amount from the axis-dependent translational compensation amount;
   a rotational compensation amount calculating unit that obtains a rotational compensation amount from the axis-dependent rotational compensation amount;
   a compensation amount adding unit that adds the translational compensation amount to a command linear axis position and adds the rotational compensation amount to a command rotary axis position; and
   a unit that drives the three linear axes and the two rotary axes to positions obtained by the compensation amount adding unit.

2. The numerical controller according to claim 1, wherein the axis-dependent compensation amount calculating unit obtains a rotary axis-dependent translational compensation amount and a rotary axis-dependent rotational compensation amount as the axis-dependent translational compensation amount and the axis-dependent rotational compensation amount, respectively, on the basis of the command rotary axis position,
   the translational compensation amount calculating unit obtains the translational compensation amount from the rotary axis-dependent translational compensation amount obtained by the axis-dependent compensation amount calculating unit, and
   the rotational compensation amount calculating unit obtains the rotational compensation amount from the rotary-axis dependent rotational compensation amount obtained by the axis-dependent compensation amount calculating unit.

3. The numerical controller according to claim 1, wherein the axis-dependent compensation amount calculating unit obtains a linear axis-dependent translational compensation amount and a linear axis-dependent rotational compensation amount as the axis-dependent translational compensation amount and the axis-dependent rotational compensation amount, respectively, on the basis of the command linear axis position,
   the translational compensation amount calculating unit obtains the translational compensation amount from the linear axis-dependent translational compensation amount obtained by the axis-dependent compensation amount calculating unit, and
   the rotational compensation amount calculating unit obtains the rotational compensation amount from the linear axis-dependent rotational compensation amount obtained by the axis-dependent compensation amount calculating unit.

4. The numerical controller according to claim 1, wherein the axis-dependent compensation amount calculating unit obtains a linear axis-dependent translational compensation amount and a linear axis-dependent rotational compensation amount on the basis of the command linear axis position and further obtains a rotary axis-dependent translational compensation amount and a rotary axis-dependent rotational compensation amount on the basis of the command rotary axis position, as the axis-dependent translational compensation amount and the axis-dependent rotational compensation amount, the translational compensation amount calculating unit obtains the translational compensation amount from the linear axis-dependent translational compensation amount and the rotary axis-dependent translational compensation amount obtained by the axis-dependent compensation amount calculating unit, and the rotational compensation amount calculating unit obtains the rotational compensation amount from the linear axis-dependent rotational compensation amount and the rotary axis-dependent rotational compensation amount obtained by the axis-dependent compensation amount calculating unit.

5. The numerical controller according to claim 1, wherein the two rotary axes are rotary axes for turning a tool head, and the rotational compensation amount calculating unit obtains a compensation amount for rotating for compensation of a rotational error tool length compensation vector having a rotational error with respect to a tool length compensation vector as the rotational compensation amount.

6. The numerical controller according to claim 1, wherein the axis-dependent compensation amount calculating unit divides a three-dimensional coordinate system space defined by the three linear axes into lattice regions at predetermined intervals in the respective axis directions, stores lattice point compensation vectors having rotational compensation amounts and translational compensation amounts for respective lattice points in the lattice regions, and calculates linear axis-dependent rotational compensation amounts and linear axis-dependent translational compensation amounts for positions of the three linear axes on the basis of the lattice point compensation vectors.

7. The numerical controller according to claim 1, wherein the axis-dependent compensation amount calculating unit divides a two-dimensional coordinate system space defined by the two rotary axes into lattice regions at predetermined intervals in the respective lattice directions, stores lattice point compensation vectors having rotational compensation amounts and translational compensation amounts for respective lattice points in the lattice regions, and calculates rotary axis-dependent rotational compensation amounts and rotary axis-dependent translational compensation amounts for positions of the two rotary axes on the basis of the lattice point compensation vectors.

8. The numerical controller according to claim 1, wherein the axis-dependent compensation amount calculating unit divides a one-dimensional coordinate system space of one rotary axis of the two rotary axes at predetermined intervals, stores division point compensation vectors having rotational compensation amounts and translational compensation amounts for respective division points at the predetermined intervals, divides a one-dimensional coordinate system space of the other rotary axis at predetermined intervals, stores division point compensation vectors having rotational compensation amounts and translational compensation amounts for respective division points at the predetermined intervals, and calculates rotary axis-dependent rotational compensation amounts and rotary axis-dependent translational compensation amounts for positions of the respective two rotary axes on the basis of the division point compensation vectors.

9. The numerical controller according to claim 1, wherein the axis-dependent compensation amount calculating unit divides a two-dimensional coordinate system space defined by two linear axes of the three linear axes into lattice regions at predetermined intervals in the respective axis directions, stores lattice point compensation vectors having rotational compensation amounts and translational compensation amounts for respective lattice points in the lattice regions, and calculates linear axis-dependent rotational compensation amounts and linear axis-dependent translational compensation amounts for positions of the two linear axes on the basis of the lattice point compensation vectors, and also divides a one-dimensional coordinate system space of the other one linear axis of the three linear axes at predetermined intervals, stores division point compensation vectors having rotational compensation amounts and translational compensation amounts for respective division points at the predetermined intervals, and calculates linear axis-dependent rotational compensation amounts and linear axis-dependent translational compensation amounts for a position of the other one linear axis on the basis of the division point compensation vectors.

10. The numerical controller according to claim 1, wherein the axis-dependent compensation amount calculating unit divides one-dimensional coordinate system spaces of the respective three linear axes at predetermined intervals, stores division point compensation vectors having rotational compensation amounts and translational compensation amounts for respective division points at the predetermined intervals, and calculates linear axis-dependent rotational compensation amounts and linear axis-dependent translational compensation amounts for respective positions of the three linear axes on the basis of the division point compensation vectors.

11. The numerical controller according to claim 1, wherein the command linear axis position and the command rotary axis position are positions of the three linear axes and the two rotary axes interpolated on the basis of a program command.

12. The numerical controller according to claim 1, wherein the command linear axis position and the command rotary axis position are positions of the three linear axes and the two rotary axes commanded by a program command.

* * * * *